(12) United States Patent
Tsujimura et al.

(10) Patent No.: US 6,661,564 B2
(45) Date of Patent: Dec. 9, 2003

(54) ELECTRONIC APPARATUS AND ELECTRONIC APPARATUS INFORMATION DISPLAY METHOD

(75) Inventors: Takatoshi Tsujimura, Fujisawa (JP); Koichi Miwa, Yokohama (JP); Hiroshi Suzuki, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/114,846

(22) Filed: Apr. 2, 2002

(65) Prior Publication Data

US 2003/0020999 A1 Jan. 30, 2003

(30) Foreign Application Priority Data

Apr. 4, 2001 (JP) ........................................ 2001-106211

(51) Int. Cl.[7] .............................................. G02B 26/00
(52) U.S. Cl. ...................................... 359/296; 345/107
(58) Field of Search ................................ 359/296, 452, 359/253; 345/107, 105, 108, 84; 204/450, 485, 490, 600; 356/41

(56) References Cited

U.S. PATENT DOCUMENTS 3,668,106 A * 6/1972 Ota ............................ 358/305
5,508,720 A * 4/1996 DiSanto et al. ............. 345/169
6,198,809 B1 * 3/2001 Disanto et al. ........... 379/93.23
2001/0005567 A1 * 6/2001 Harada et al. ................ 430/32
2002/0090980 A1 * 7/2002 Wilcox et al. .............. 455/566
2002/0166771 A1 * 11/2002 Kanbe ......................... 204/600

FOREIGN PATENT DOCUMENTS

| JP | 5-158420 | 6/1993 |
| JP | 11-502950 | 3/1999 |
| JP | 2000-137250 | 5/2000 |
| JP | 2000-285219 | 10/2000 |
| JP | 2000-13065 | 12/2000 |

* cited by examiner

Primary Examiner—Ricky Mack
Assistant Examiner—Brandi N Thomas
(74) Attorney, Agent, or Firm—James J. Cioffi

(57) ABSTRACT

An electrophoretic display is mounted on the surface of the housing of a notebook type personal computer. When an event that requires the user to operate a member occurs, the member and operation information corresponding to that event are searched for, and the searched-for operation information is displayed in a region of the electrophoretic display in the vicinity of the searched-for member. For example, when a termination switch is in a corner of the exterior surface of the cover, for a system termination event, information indicating that the termination switch should be operated is displayed in a region of the electrophoretic display in the vicinity of the termination switch.

9 Claims, 12 Drawing Sheets

# US 6,661,564 B2

ELECTRONIC APPARATUS AND ELECTRONIC APPARATUS INFORMATION DISPLAY METHOD

BACKGROUND OF THE INVENTION

1. Field of the Invention

The present invention relates to an electronic apparatus, such as a notebook type personal computer, for example, and an electronic apparatus information display method, and relates in particular to an electronic apparatus and electronic apparatus information display method that provides improved information display for the user.

2. Description of Related Art

The use of electrophoretic displays as displays for electronic apparatuses such as electronic books and cards, and the like, is widely known (examples: Japanese National Publication of International Patent Application No. 1999-502950 specification and Published Unexamined Japanese Patent Application No. 2000-285219 specification). Also, in a notebook type personal computer such as an electronic apparatus, the use of an electrophoretic display instead of a liquid crystal display is also widely known (Published Unexamined Japanese Patent Application No. 2000-137250 specification).

The advantages of an electrophoretic display are as follows:

(a) can be made extremely thin: approximately 100 μm, for example;
(b) can be applied without problems to curved surfaces and in constricted places;
(c) has a memorizing capability, and it is sufficient to apply a drive voltage only in display switching and not apply a drive voltage after a predetermined display has been achieved, thereby greatly reducing power consumption.

In the case of a notebook type personal computer, for example, there is an on status and an off status with regard to the power supply, and a suspended status and non-suspended status with regard to the CPU, and with conventional notebook type personal computers, these electrical status are indicated to the user by illumination or non-illumination of a small light emitting device such as an LED (light emitting diode).

However, light emitting devices used for electrical status displays heretofore have been small and difficult for the user to see. In addition, shortcomings of current electrophoretic displays are as follows:

(a) the operation speed is greatly influenced by the applied voltage, making a high drive voltage necessary in order to achieve a fast response;
(b) when using low-voltage drive, as on battery power, the response speed is slow—on the order of several seconds.

Moreover, the character input keys of a conventional computer keyboard have the characters that can be input in a plurality of modes pre-printed on their top surfaces. Also, function keys can be assigned a variety of functions by various applications, and it is difficult to mark all of these beforehand on the top surfaces of the keys. This requires the user to rely on his or her memory when operating the function keys in different applications or modes.

A conventional electrophoretic display provided in an electronic apparatus is located where it is most easily seen by the user, and displays various kinds of information in common. However, such information is not always displayed in the vicinity of a member, such as a key or push button, to be operated. It would be difficult for a user to quickly access the member in response to the displayed information.

As a result of having all characters that can be input in a plurality of modes marked on the top surfaces of character input keys on a conventional computer keyboard, it is difficult for the user to identify the character to be input by current operation of a character input key. Also, since function keys are not marked with the function that can be processed by current operation, these keys are difficult to use.

SUMMARY OF THE INVENTION

It is an object of the present invention to provide an electronic apparatus and electronic apparatus information display method that makes it possible to present an inexperienced user with information concerning a member to be operated at the present time in an easily understood form.

It is another object of the present invention to provide an electronic apparatus and electronic apparatus information display method that makes the various electrical status of an electronic apparatus easy to understand for a user by means of a sufficiently large surface display.

It is yet another object of the present invention to provide an electronic apparatus and electronic apparatus information display method that makes it easy for a user to understand which input, etc., is currently assigned to a member to which a plurality of inputs, functions, and the like, are assigned.

These and other purposes of the present invention will become more apparent after referring to the following description considered in conjunction with the accompanying drawings.

BRIEF SUMMARY OF THE INVENTION

The purposes and advantages of the present invention have been achieved by providing according to a first aspect of the present invention an electronic apparatus comprising the following items:

a housing that accommodates an electronic element internally;
    an electrophoretic display arranged on all or part of the surface of the housing;
    a display controller for displaying on the electrophoretic display an operation guide for a user.

A brief message for instructing a user to operate a member, such as key, button or switch, is one of an example of an operation guide. Also, it may be an illustration such as icon representing a specific operation or function of an apparatus. Further, it may be an illustration, pattern or icon which is disposed on a surface of a member to be operated by a user.

The concept of electronic apparatus includes portable electronic apparatus such as notebook type personal computers, PDAs (Personal Digital Assistants), and mobile phones, and also non-portable electronic apparatus such as desktop computers, fixed-line phones, and home electrical appliances. An electrophoretic display typically comprises cells, and a dispersion medium and suspended substance injected into those cells. The substance generally consists of charged particles, an example of charged particles being positively or negatively charged titanium oxide powder.

A noteworthy feature of the first aspect of the present invention is that an electrophoretic display is arranged on the surface of the electronic apparatus housing. That is to say, there is a housing that accommodates various elements of the electronic apparatus, and an electrophoretic display is arranged on the surface of that housing. With current technology, it is possible for an electrophoretic display to have a thickness of approximately 100 $\mu$m, and to be installed on any surface of the housing. With a conventional notebook type personal computer, for example, a liquid crystal display is not mounted on the housing surface, but an aperture is formed in the housing, and the liquid crystal display is mounted in that aperture so as to be exposed from that aperture. Also, with a conventional notebook type personal computer, light emitting devices such as LEDs are used to indicate information such as the power supply on/off status, and since these light emitting devices are markedly thicker than an electrophoretic display, they are not mounted on the surface of the housing, but installed in holes made in the housing.

Electrophoretic display mounting methods include, for example, (i) a method whereby film formation of an underside electrode on the housing surface, painting of electrophoretic cells on the surface of the underside electrode, and film formation of a top-side electrode on the electrophoretic cell surfaces, are executed in that order, and (ii) a method whereby a film-type electrophoretic display comprising three layers (underside electrode, electrophoretic cells, and top-side electrode) is affixed to the housing surface.

In the first aspect of the present invention, information displayed on the display is preferably an operation guide for a user, and as the number of characters, symbols, etc., for a typical operation guide is small, and it is not changed frequently, an electrophoretic display can display information exhibiting its advantages while its shortcomings are not a problem. Also, an electrophoretic display has few restrictions as to placement space and placement location, and current operation guide can be arranged on the part of the housing that is most easily seen by the user. Thus, it is possible to arrange an electrophoretic display on a suitable part of the housing of an electronic apparatus, and display operation information on the electronic apparatus so as to be easily understood by the user.

An electronic apparatus of a second aspect of the present invention has, in an electronic apparatus of the first aspect of the present invention, a main display for displaying information by a display method that allows faster operation than an electrophoretic display, and a member operated by the user. An electrophoretic display is arranged at a place closer to the member than a main display, and a display controller displays operation guides related to the member on the electrophoretic display which is at a location close to the member.

If the electronic apparatus is a notebook type personal computer, for example, the main display may be a liquid crystal type display, for example. As the electronic apparatus is equipped with a main display capable of high-speed operation separate from the electrophoretic display, normal display for which high-speed operation is desirable is performed by the main display, and operation guide related display for which high-speed operation is not particularly necessary is performed by the electrophoretic display, so that overall information display for the electronic apparatus can be achieved without inconveniencing the user. Also, as the electrophoretic display is arranged closer to a member to be operated than the main display, and displays operation guides about that member, the user can ascertain readily the member that should be operated.

According to an electronic apparatus of a third aspect of the present invention, in an electronic apparatus of the second aspect of the present invention a display controller displays on an electrophoretic display a guide for informing a user of a member to be operated by the user.

The number of members that should be operated at the present time is not necessarily one, but may be a plurality. By looking at the display of the electrophoretic display, the user can accurately and efficiently find members to be operated at the present time.

With an electronic apparatus of a fourth aspect of the present invention, in an electronic apparatus of any one of the first to third aspects of the present invention there is an event detector for detecting an event that requests operation of a predetermined member by the user, and member search logic for searching for a member to be operated by the user in response to an event when an event is detected. The display controller displays in a region of the electrophoretic display, in the vicinity of a searched member (hereinafter referred to as "nearby region"), a guide for informing a user of a member to be operated by the user.

A nearby region is defined as a location where display information indicating that a member should be operated by the user at the present time is sufficiently close to a member for the user to immediately identify that member. The user can grasp accurately and efficiently from the display of the electrophoretic display the member that should be operated at the present time.

With an electronic apparatus of a fifth aspect of the present invention, in an electronic apparatus of the fourth aspect of the present invention there is furthermore explanatory information search logic for searching a predetermined database for explanatory information to be displayed in a region of an electrophoretic display in response to an event when an event is detected. The display controller displays searched explanatory information as at least part of the operation guide in a nearby region of the electrophoretic display.

Explanatory information may include, for example, how a member is to be operated (for example: held down for two seconds or longer), what kind of processing is performed by the operation (for example: quitting Windows), or the like.

As explanatory information is displayed in a nearby region of the electrophoretic display, the user can understand accurately the processing he or she is about to perform, and can operate the member correctly. For example, if an incorrect event occurs when the user is attempting to quit Windows, and the explanatory information indicates that a processing other than quitting Windows will be executed as a result of the operation, the user can refrain from performing an incorrect operation.

An electronic apparatus of a sixth aspect of the present invention comprises the following items:

a housing that accommodates an electronic element internally;

an electrophoretic display arranged on all or part of the surface of the housing;

a display controller for displaying on the electrophoretic display an electrical status of the electronic apparatus or a predetermined electronic element provided therein.

Electrical status of the electronic apparatus or a predetermined electronic element provided therein include not only two, but also three or more, electrical status. Displays corresponding to the various electrical status of the electronic apparatus or a predetermined electronic element provided therein include character display, symbol display, graphic display, and color display. Depending on the case, display by an electrophoretic display corresponding to such electrical status may also include low-speed moving pictures. For each electronic apparatus or predetermined electronic element provided therein, there is a place suitable for displaying these electrical status to the user. By displaying electrical status using an electrophoretic display, electrical status can be displayed smoothly at a place suitable for display. In a notebook type personal computer, for example, the outer surface of the cover on which a liquid crystal display is mounted can be seen from outside even when that cover is closed, and is therefore a suitable place for displaying an electrical status concerning the power supply on/off status.

According to an electronic apparatus of a seventh aspect of the present invention, in an electronic apparatus of the sixth aspect of the present invention electrical status of an electronic apparatus or predetermined electronic element provided therein include the on status or off status of the electronic apparatus power supply, and/or the suspended status or non-suspended status of a CPU as an electronic element.

According to an electronic apparatus of an eighth aspect of the present invention, in an electronic apparatus of the sixth or seventh aspect of the present invention the display controller displays on an electrophoretic display a color corresponding to an electrical status of the electronic apparatus or a predetermined electronic element provided therein.

Switching of electrophoretic display colors includes not only switching of two colors but also switching of three or more colors. When two colors are to be displayed on an electrophoretic display, this is possible by means of color switching of the dispersion medium and particles within cells. When three or more colors are to be displayed on an electrophoretic display, color filters are mounted on the upper side of the cells, with these color filters divided into three or more colors, such as R (red), G (green), and B (blue), and not the same color but three or more colors are used for the dispersion medium in each cell.

An electronic apparatus of a ninth aspect of the present invention comprises the following items:

at least one member operated by the user;

an electrophoretic display arranged on the top surface and/or a side surface of a member;

a display controller for displaying on the electrophoretic display an icon representing the function of the member. The icon may include a character or a graphic pattern. Also, the display can display another icon representing another function of the member in response to operation mode of the apparatus.

The members include, for example, operating keys and operating buttons. Operating keys include, for example, character input keys and function keys on the keyboard of a notebook type or desktop type personal computer, keys on the keypad of a mobile phone or fixed-line phone, and keys on various kinds of remote controllers. Although the key-tops are small, there is no problem with mounting an electrophoretic display. With conventional keys, a display is not mounted on the key-tops, and therefore either all input characters and functions that can be input are marked, or else such marking is foregone. With the present invention electrophoretic displays are arranged on the top surfaces and/or side surfaces of members, and input characters, etc., that are valid for current operation, are displayed on the electrophoretic displays, enabling the user to identify them at a glance.

According to an electronic apparatus of a tenth aspect of the present invention, in an electronic apparatus of the ninth aspect of the present invention the members are a plurality of character input keys for inputting character code data corresponding to specific character input modes, and the display controller displays on electrophoretic displays input characters valid for operation of each character input key in the current character input mode.

According to an electronic apparatus of an eleventh aspect of the present invention, in an electronic apparatus of the tenth aspect of the present invention an electrophoretic display is provided with top-surface electrodes forming input characters corresponding to each character input mode on each character key. Each top-surface electrode for the same character set is connected to a common voltage pulse application line. The display controller, when the input mode is switched, supplies a display character erasure voltage pulse to a pulse application line corresponding to the character before switching, and also supplies a display character display voltage pulse to a pulse application line corresponding to the character after switching.

Each character input key is provided with a plurality of top-surface electrodes forming an input character corresponding to each character input mode, so that it is possible to display the input character corresponding to each character input mode on each character input key simply by supplying a voltage pulse to a common pulse application line corresponding to a character input mode. The input character shaped electrodes provided on each character input key include segment electrodes, and moreover, these segment electrodes include hiragana character type electrodes and alphanumeric type electrodes, etc., in the embodiments to be described later. Also, electrophoretic displays have a memorizing capability and have the advantage of enabling display to be continued simply by applying a voltage pulse only when switching, but on the other hand, have a disadvantage in that the characters of the character input mode prior to switching do not disappear. However, display of input characters corresponding to the character input mode prior to switching can be erased from the character input keys simply by supplying an erasure voltage pulse to a common pulse application line corresponding to the character input mode prior to switching (this erasure voltage pulse may have the opposite polarity of the display start voltage pulse, for example).

According to an electronic apparatus of a twelfth aspect of the present invention, the members are a plurality of function keys in an electronic apparatus of any one of the ninth to eleventh aspects of the present invention. During operation of a Japanese input system, the display controller displays on electrophoretic displays character conversion characters valid for operation of each function key.

In an electronic apparatus of a thirteenth aspect of the present invention, an electronic apparatus of the twelfth aspect of the present invention has a Japanese input system operation detector for detecting current operation or current non-operation of a Japanese input system. The display controller displays on electrophoretic displays character conversion characters valid for operation of each function key.

Function keys are often used as character switching keys during Japanese input system operation. User convenience is greatly improved by having the character conversion characters allocated to operation of each function key during Japanese input system operation displayed on an electrophoretic display on each function key.

An electronic apparatus information display method of the present invention comprises the following steps:

searching information from a storage inside or outside an apparatus in accordance with the status of the apparatus;

displaying a searched information on an electrophoretic display arranged on all or part of the surface of a housing that accommodates an electronic element internally.

It is desirable to display on an electrophoretic display arranged at a location closer to a member than a main display provided as an entity for displaying information with a display method that allows faster operation than an electrophoretic display. It is desirable, when a member in the vicinity of an electrophoretic display should be operated by the user at the present time, to display on the electrophoretic display a guide for informing a user of a member to be operated by the user. It is desirable to detect an event that requests predetermined operation of a member by the user, search for a member to be operated by the user in response to an event when an event is detected, and display in a region of an electrophoretic display in the vicinity of a searched member (hereinafter referred to as "nearby region"), a guide for informing a user of a member to be operated by the user. It is desirable to search a predetermined database for explanatory information to be displayed in a region of an electrophoretic display in response to an event when an event is detected, and display searched explanatory information as at least part of the operation information in a nearby region of an electrophoretic display.

Another electronic apparatus information display method of the present invention comprises the following steps:

detecting an electrical status of an electronic apparatus or a predetermined electronic element provided therein;

displaying a detected electrical status on an electrophoretic display arranged on all or part of the surface of a housing accommodating an electronic element internally.

It is desirable for electrical status of an electronic apparatus or a predetermined electronic element provided therein to include the on status or off status of the power supply of the electronic apparatus and/or the suspended status or non-suspended status of a CPU as an electronic element. It is desirable to display on an electrophoretic display a color corresponding to an electrical status of the electronic apparatus or a predetermined electronic element provided therein.

Yet another electronic apparatus information display method of the present invention comprises the following steps:

searching a name of an operation or detailed/or brief explanation of the operation, with regard to currently desired operation of a member;

displaying on an electrophoretic display arranged on the top surface and/or a side surface at least one of member of the searched information to be operated by the user.

According to an electronic apparatus information display method whereby character input keys are selected as members, it is desirable to display on an electrophoretic display an input character valid for operation of each character input key in the current character input mode. Moreover, it is desirable, in input mode switching, to supply a display character erasure voltage pulse to a pulse application line corresponding to the character before switching, and to supply a display character display voltage pulse to a pulse application line corresponding to the character after switching, for an electronic apparatus wherein an electrophoretic display provided with top-surface electrodes forming input characters corresponding to each character input mode on each character key, and each top-surface electrode for the same character, are connected to a common voltage pulse application line.

According to an electronic apparatus information display method whereby character input keys are selected as members, it is desirable to display on an electrophoretic display an input function name with regard to operation of each function key as a member in the current function mode. Moreover, it is desirable to detect current operation or current non-operation of a Japanese input system, and during operation of a Japanese input system, to display on an electrophoretic display a character conversion character that is valid for operation of each function key.

BRIEF DESCRIPTION OF THE DRAWINGS

The features of the invention believed to be novel and the elements characteristic of the invention are set forth with particularity in the appended claims. The figures are for illustration purposes only and are now drawn to scale. The invention itself, however, both as to organization and method of operation, may best be understood by reference to the detailed description which follows taken in conjunction with the accompanying drawings in which:

DESCRIPTION OF THE INVENTION

The present invention will now be described in detail based on the embodiments shown in the attached drawings.

Figure 1:
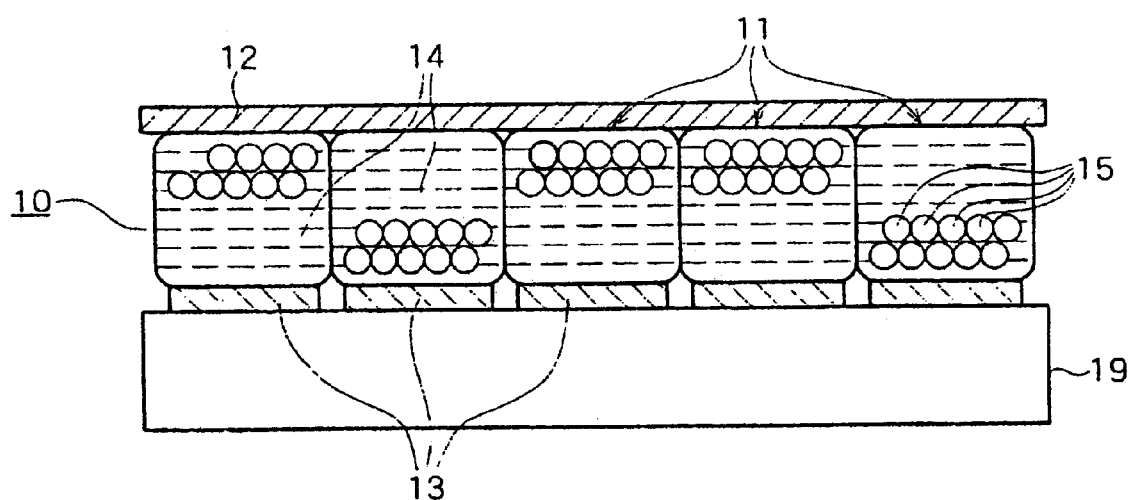
FIG. 1 is a vertical cross-sectional drawing showing the schematic configuration of an electrophoretic display.

Referring to FIG. 1 there is shown a vertical cross-sectional drawing showing the schematic configuration of an electrophoretic display 10. The electrophoretic display 10 has three layers, cells 11 in the middle looking vertically, and an upper electrode 12 and lower electrodes 13 film, formed on the top and bottom of the cells 11, respectively, and is mounted on the surface of a housing 19. The cells 11 are arranged in one layer vertically and are closely arranged horizontally without gaps between them, and each cell 11 is injected with a colored dispersion medium 14 and a predetermined quantity of white titanium oxide powder 15. The upper electrode 12 is colorless and transparent, and the upper electrode 12 and lower electrodes 13 are arranged in the form of a lattice in a plan view, with each lattice point forming a pixel of the electrophoretic display 10, and with a voltage being applied from both the top and bottom of a cell 11 at an arbitrary lattice point. The white powder 15 in each cell 11 is positively or negatively charged. When negatively charged, for example, in a cell 11 for which the upper electrode 12 and lower electrode 13 are positive and negative, respectively, the white powder 15 migrates to the upper electrode 12 and that cell 11 appears white to the user, whereas in a cell 11 for which the upper electrode 12 and lower electrode 13 are negative and positive, respectively, the white powder 15 migrates to the lower electrode 13 and that cell 11 appears the color of the dispersion medium 14 to the user. The electrophoretic display 10 has a memorizing capability, and after the white powder 15 has finished migrating to the upper electrode 12 or lower electrode 13, it maintains its position even if the voltage applied between the upper electrode 12 and lower electrode 13 is cut. Therefore, voltage application to the upper electrode 12 and lower electrode 13 is necessary only when switching the position of the white powder 15 to the upper electrode 12 or lower electrode 13, and the overall power consumption of the electrophoretic display 10 is extremely low.

Figure 2A:
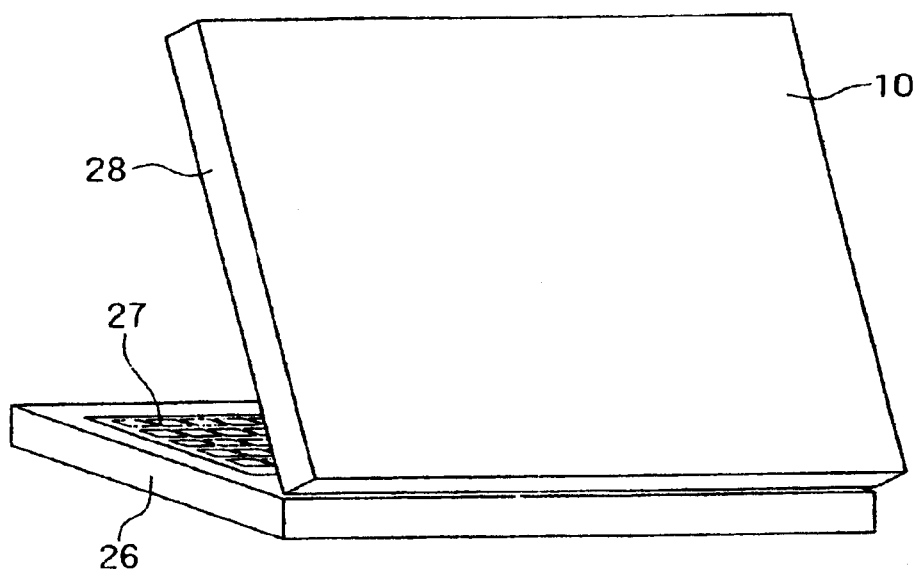
FIG. 2 shows color changes for power supply off and on status of a notebook type personal computer.
Figure 2B:
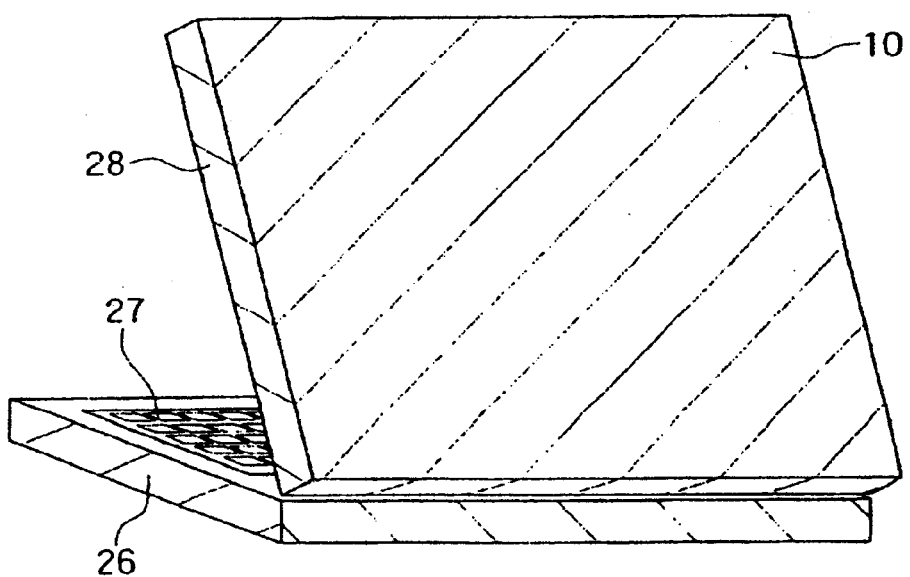

FIG. 2 shows color changes for power supply off and on status of a notebook type personal computer 25. The notebook type personal computer 25 has a main body 26 equipped with a keyboard 27 on top, and a cover 28 attached to the rear side of the main body 26 at its lower side that opens and closes on the top of the main body 26. A liquid crystal display 64 (FIG. 12) is mounted on the inner surface of the main body 26, that is, opposite the top of the main body 26. The electrophoretic display 10 is mounted on the entire surface except the bottom surface of the housing of the main body 26, and on the housing of the cover 28, is mounted on the entire surface except the bottom surface when the cover 28 is closed. When the status of the power supply of the notebook type personal computer 25 is off, the electrophoretic display 10 is white, the color of the white powder 15, as shown in (2a), and when the status of the power supply of the notebook type personal computer 25 is on, the electrophoretic display 10 is the color of the dispersion medium 14, as shown in (2b). In drawing (2b), the color of the dispersion medium 14 is indicated by diagonal lines. The electrophoretic display 10 occupies virtually the entire area of the notebook type personal computer 25, enabling the user to easily recognize a color change in the electrophoretic display 10, and ascertain whether the power supply status of the notebook type personal computer 25 is currently on or off.

Figure 3:
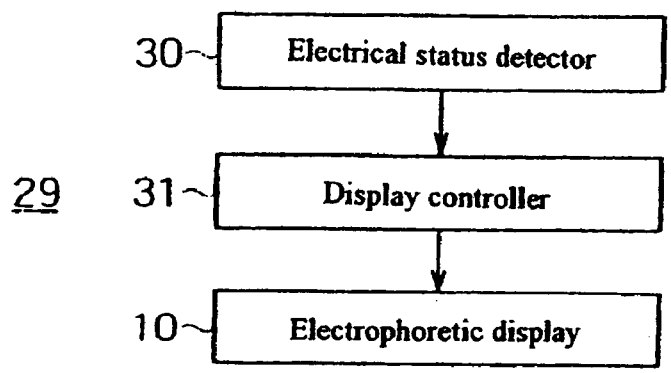
FIG. 3 is a function block diagram of an electrical status information display apparatus provided in the notebook type personal computer in FIG. 2.

FIG. 3 is a function block diagram of an electrical status information display apparatus 29 provided in a notebook type personal computer 25. In the electrical status information display apparatus 29, an electrical status detector 30 detects a predetermined electrical status. The electrical status determined by the electrical status detector 30 may be the power supply on/off status of the notebook type personal computer 25, as described above, or, in addition, may be, for example, the presence or absence of the suspended status of the CPU of the notebook type personal computer 25. A display controller 31 controls the color of the electrophoretic display 10 on the basis of the electrical status detected by the electrical status detector 30. The display controller 31 can also indicate an electrical status on the electrophoretic display 10 by means of characters or graphics, for example, as well as by means of color.

Figure 4:
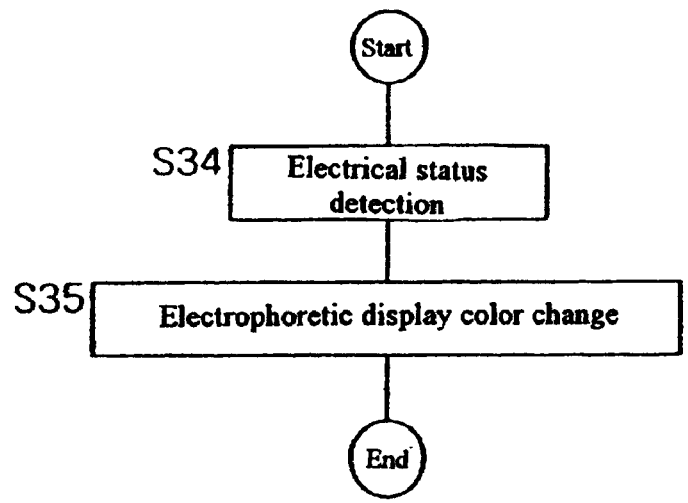
FIG. 4 is a flowchart of the electrical status information display processing executed by the notebook type personal computer in FIG. 2.

FIG. 4 is a flowchart of the electrical status information display processing executed by the notebook type personal computer 25 in FIG. 2. In S34, an electrical status is detected. In S35, the color of the electrophoretic display 10 is changed on the basis of the electrical status detected in S34.

Figure 5A:
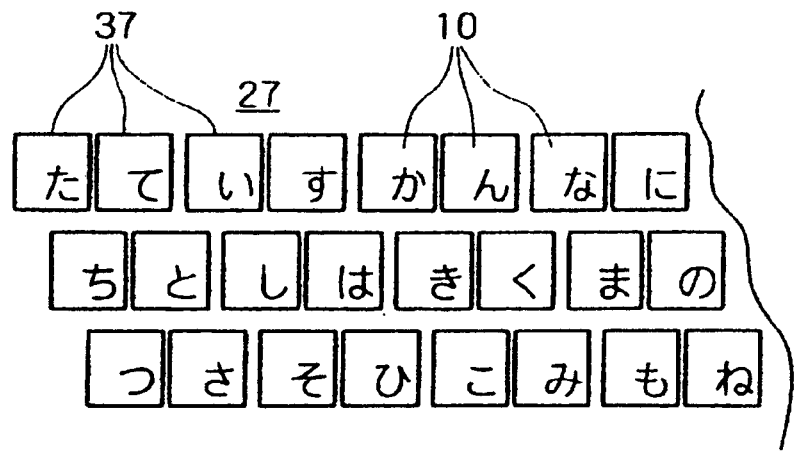
FIG. 5 is a drawing showing the display status of each character input key on the keyboard section of a notebook type personal computer.
Figure 5B:
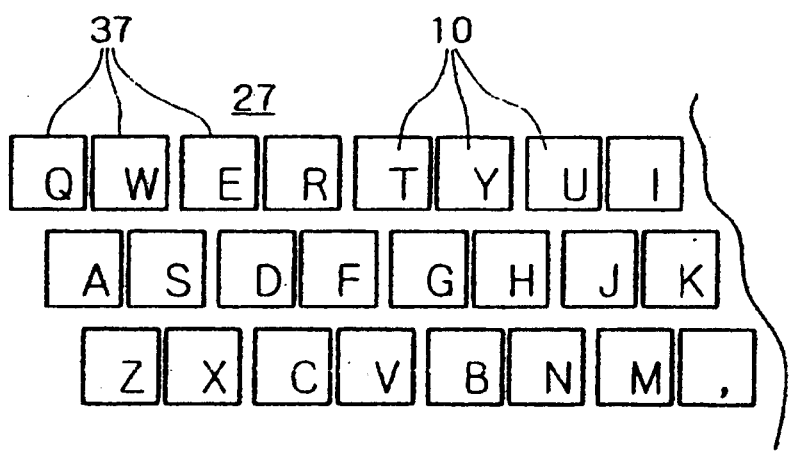

FIG. 5 shows the display status of each character input key 37 on the keyboard section 27 of the notebook type personal computer 25. An electrophoretic display 10 is mounted on the top surface of each character input key 37, and in the case of a hiragana input mode when a Japanese input system is on, the electrophoretic display 10 on each character input key 37 displays the hiragana character to be input in response to operation of each character input key 37 (taking "hiragana" to include punctuation marks and other Japanese symbols), as shown in (5a). In the case of a Roman-character input mode or alphanumeric input mode when a Japanese input system is on, or when a Japanese input system is off, the electrophoretic display 10 on each character input key 37 displays the alphanumeric character to be input in response to operation of each character input key 37 (taking "alphanumeric characters" to include a period, comma, and other English symbols), as shown in (5b).

Figure 6:
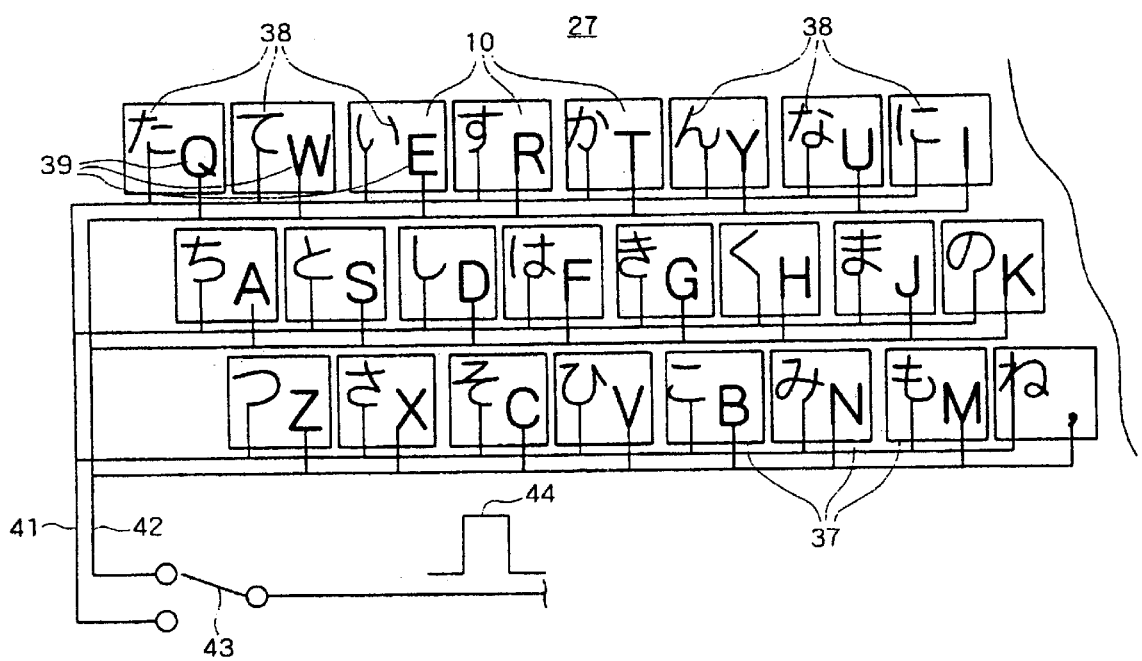
FIG. 6 is a drawing showing the electrode arrangement, etc., of each character input key of the keyboard section in detail.

FIG. 6 shows the electrode arrangement, etc., of each character input key 37 of the keyboard section 27 in detail. On each character input key 37 is arranged, as the upper electrode 12 of an electrophoretic display 10, a hiragana character type electrode 38 and an alphanumeric character type electrode 39 as segment electrodes having, respectively, the shape of a hiragana character and an alphanumeric character, to be input in response to depression of that character input key 37. Each hiragana character type electrode 38 is connected to a common pulse application line 41, and each alphanumeric character type electrode 39 is connected to a common pulse application line 42. A switch 43 selectively supplies an application voltage pulse 44 to pulse application line 41 or pulse application line 42. The hiragana character type electrodes 38 and alphanumeric character type electrodes 39 are drawn in black in FIG. 6, but are actually colorless and transparent, and when an application voltage pulse 44 is applied to the hiragana character type electrodes 38 or alphanumeric character type electrodes 39 via the switch 43, the white powder 15 in the cells 11 directly below the hiragana character type electrodes 38 or alphanumeric character type electrodes 39 migrates toward the hiragana character type electrodes 38 or alphanumeric character type electrodes 39, and the regions of the hiragana character type electrodes 38 or alphanumeric character type electrodes 39 turn white. Cells 11 in which the white powder 15 has not migrated to the hiragana character type electrodes 38 or alphanumeric character type electrodes 39 become the non-white color of the dispersion medium 14. If it is wished to display hiragana characters and alphanumeric characters in a black-system color, when, for example, a black-system color powder is used instead of white powder 15, and ball-shaped particles for which each hemispherical part is black or the color of the dispersion medium (taking this dispersion medium color to be a white-system color) disclosed in Unexamined Japanese Patent Publication No. 2000-137250 are used as a migration substance to display hiragana characters and alphanumeric characters, when the black hemispherical parts are directed toward the hiragana character type electrodes 38 or alphanumeric character type electrodes 39, and display is not performed, it is only necessary to charge the ball-type particles so that the dispersion medium colored hemispherical parts are directed toward the hiragana character type electrodes 38 or alphanumeric character type electrodes 39. As the electrophoretic display 10 has a memorizing capability, there is a problem in that the alphanumeric character type electrode 39 or hiragana character type electrode 38 display does not disappear even though an application voltage pulse 44 is applied to the hiragana character type electrodes 38 or alphanumeric character type electrodes 39, but this problem can be solved by applying a pulse with the opposite polarity of the application voltage pulse 44 to the hiragana character type electrodes 38 and alphanumeric character type electrodes 39 before applying the application voltage pulse 44. In this way, the hiragana character or alphanumeric character that is valid input for the current input mode is displayed by means of the electrophoretic display 10 mounted on each character input key 37.

Figure 7:
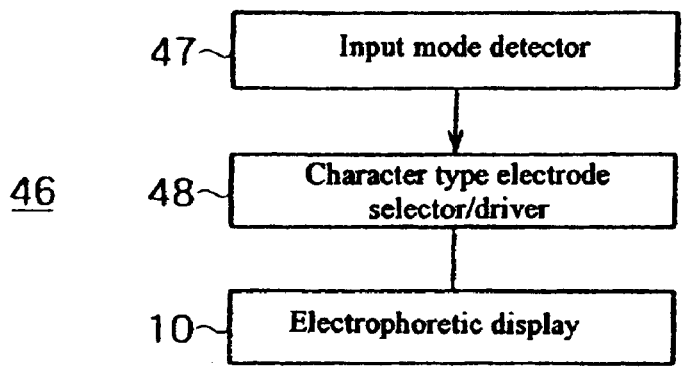
FIG. 7 is a function block diagram of an input character display control apparatus provided in the keyboard section in FIG. 6.

FIG. 7 is a function block diagram of an input character control apparatus 46 provided in the keyboard section 27 in FIG. 6. An input mode detector 47 of the input character display control apparatus 46 detects the current input mode with regard to character input from the character input keys 37 of the keyboard section 27, that is, whether the mode is hiragana input mode when the Japanese input system is on, Roman-character or alphanumeric input mode when the Japanese input system is on, or whether the Japanese input system is off. API calls to the OS can be quoted as an example of input mode detection. With Windows ("Windows" is a trademark of Microsoft Corporation), for example, when an ImmGetOpenStatus or ImmGetContext API call is performed, hiragana/kanji conversion application ON/OFF status information, and information concerning the current input mode indicating what kind of input mode (full-width alphanumeric, half-width alphanumeric, full-width hiragana, full-width katakana, half-width katakana, etc.) a hiragana/kanji conversion application is in, can be obtained from the OS. A character type electrode selector/driver 48 selects either pulse application line 41 or 42, and supplies an application voltage pulse 44 (FIG. 6) on the basis of detection by the input mode detector 47 to the selected application line. With an electrophoretic display 10, an application voltage pulse 44 is applied to the hiragana character type electrodes 38 or alphanumeric character type electrodes 39 via the character type electrode selector/driver 48, and a hiragana character or alphanumeric character according to that electrical status is displayed on each character input key 37.

Figure 8:
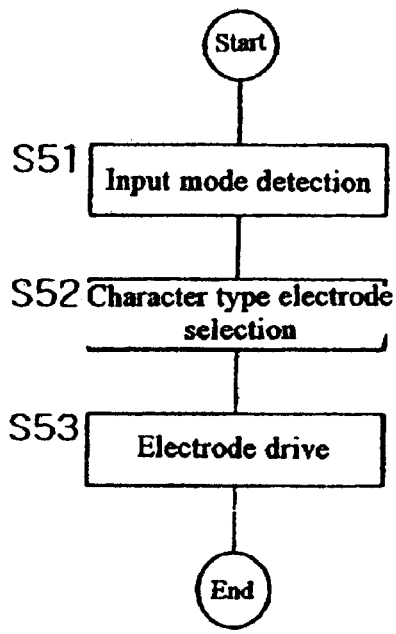
FIG. 8 is a flowchart of the display switching processing for the character input keys in FIG. 6.

FIG. 8 is a flowchart of the display switching processing for the character input keys 37 in FIG. 6. In S51, the current input mode for character input from the character input keys 37 is detected. In S52, the switch 43 is switched to select hiragana character type electrodes 38 or alphanumeric character type electrodes 39. In S53, an application voltage pulse 44 is generated and the application voltage pulse 44 is applied to the hiragana character type electrodes 38 or alphanumeric character type electrodes 39 on the basis of the selection by the switch 43.

Figure 9A:
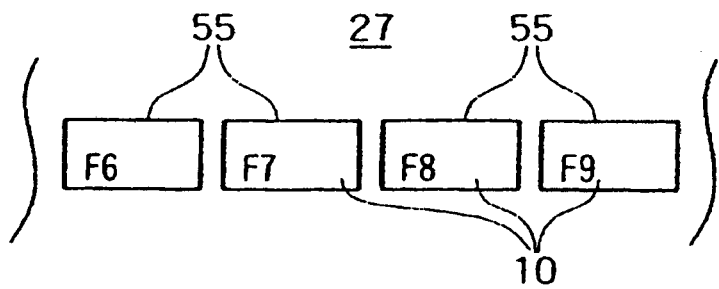
FIG. 9 is a drawing showing the key-top display of function keys arranged on the keyboard section.
Figure 9B:
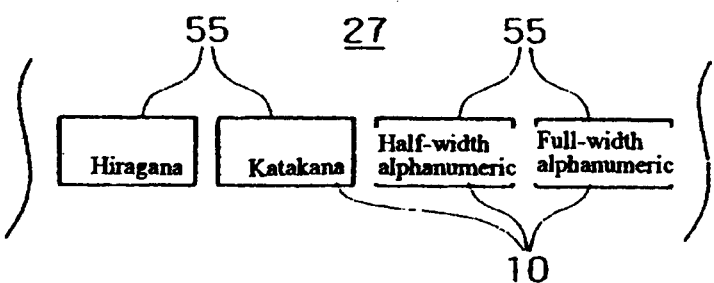

FIG. 9 shows the key-top display of function keys 55 arranged on the keyboard section 27. The function keys 55 are arranged at the rear of the keyboard section 27, and typically consist of 12 keys, F1 to F12. As with the character input keys 37 in FIG. 5, an electrophoretic display 10 is mounted on the top surface of each function key 55. In FIG. 9, function keys 55 F6 to F9 are shown by way of example, and examples of the display for each function key 55 when the Japanese input system is off and on are shown in FIG. (9a) and (9b) respectively. Japanese input systems include, for example, IME by Microsoft Corporation and ATOK by Just System Corporation. When the Japanese input system is off, F6 to F9 are displayed directly on the function keys 55 as the key names of those function keys, as shown in FIG. (9a). When the Japanese input system is on, the name of the function assigned as the function when a particular key is operated when the Japanese input system is on is displayed on the respective function key 55, as shown in FIG. (9b). The functions assigned to the function keys 55 differ according to the Japanese input system, but in the sample Japanese input system in FIG. 9, hiragana, katakana, half-width alphanumeric, and full-width alphanumeric are assigned, and are displayed as the names of the functions currently valid for these function keys. To provide this display, the electrophoretic display 10 is provided with upper electrodes 12 that have the shape of the function name, as in the case of hiragana character type electrodes 38 or alphanumeric character type electrodes 39 in FIG. 6.

Figure 10:
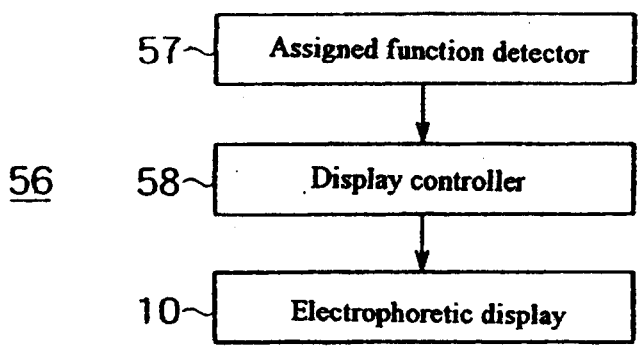
FIG. 10 is a function block diagram of a function name display control apparatus provided in the notebook type personal computer in FIG. 9.

FIG. 10 is a function block diagram of a function name display control apparatus 56 provided in a notebook type personal computer 25. An assigned function detector 57 detects the function currently valid for and assigned to each function key 55. A display controller 58 controls the application voltage for the electrode on the electrophoretic display 10 of each function key 55 so that the name of the function detected for each function key 55 by the assigned function detector 57 is displayed on each function key 55.

Figure 11:
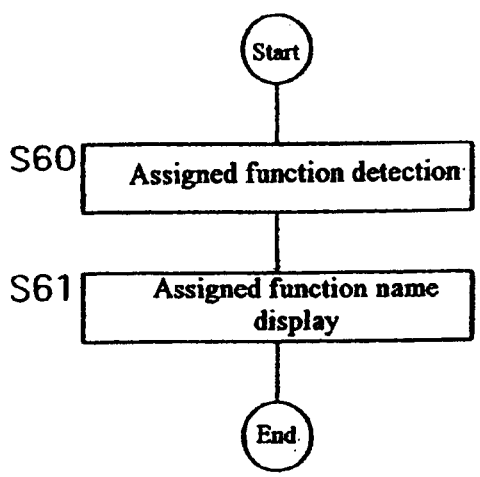
FIG. 11 is a flowchart of the processing for displaying currently valid functions on the function keys.

FIG. 11 is a flowchart of the processing for displaying currently valid functions on the function keys 55. In S60, the function currently valid for and assigned to each function key 55 is detected. In S61, the voltage applied to the electrode of the electrophoretic display 10 of each function key 55 is controlled, and the function name detected for each function key 55 in S60 is displayed on the electrophoretic display 10 of each function key 55.

Figure 12:
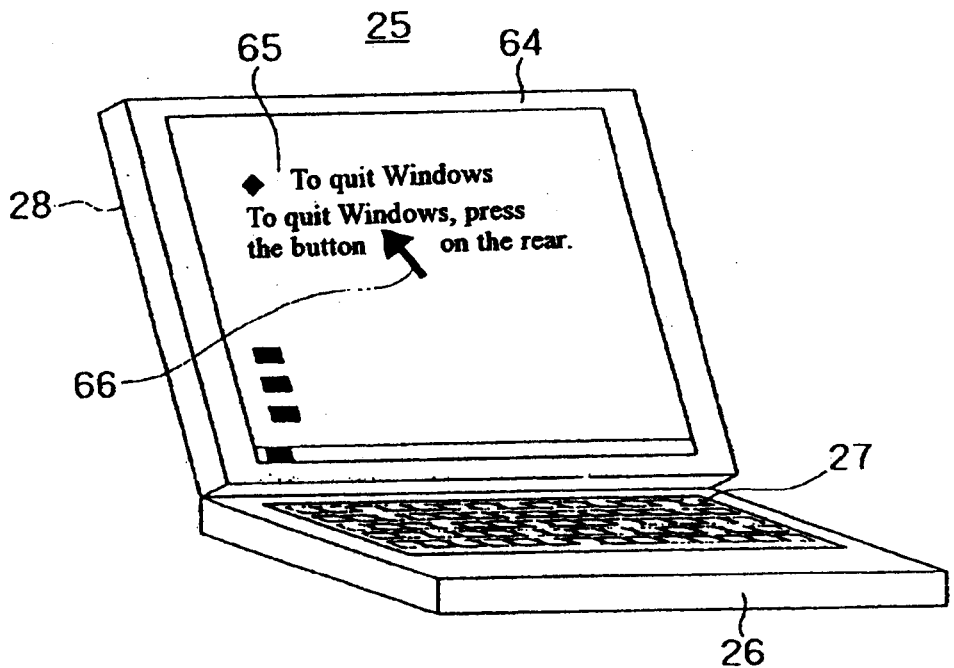
FIG. 12 is a perspective view showing an oblique front view of a notebook type personal computer with improved presentation of operation information to the user.
Figure 13:
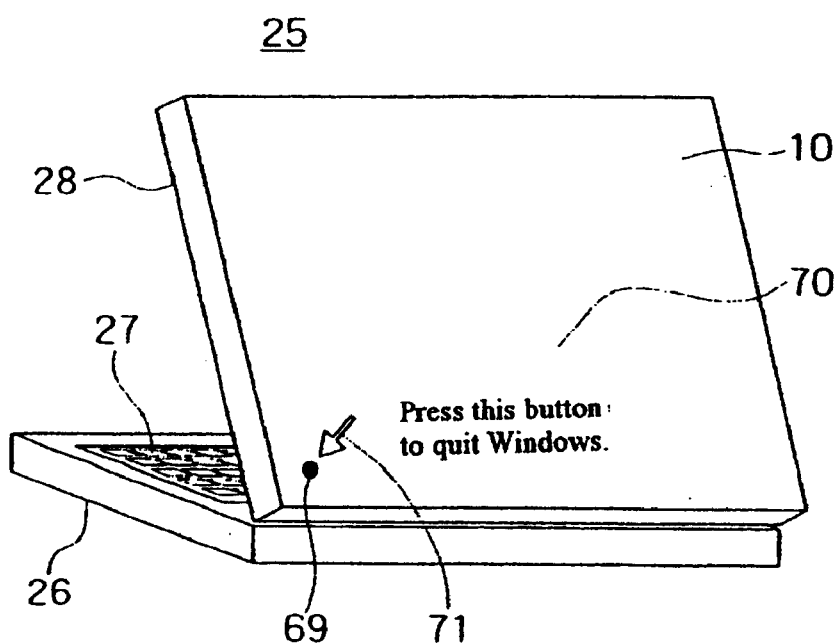
FIG. 13 is a perspective view showing an oblique rear view of a notebook type personal computer with improved presentation of operation information to the user.

FIG. 12 and FIG. 13 are perspective views of a notebook type personal computer 25 with improved presentation of an operation guide (message), showing an oblique front view and oblique rear view respectively. The cover 28 is provided with a liquid crystal display on the side facing the keyboard section 27 when closed onto the main body 26 (when the cover 28 is folded against the main body 26). With this notebook type personal computer 25, when the cover 28 is in the closed position, referring to the keyboard section 27 side and the opposite side of the cover 28 as the front side and rear side respectively, a push-button type termination switch 69 is provided in a lower corner of the rear side of the cover 28. Also, an electrophoretic display 10 is mounted on the main body 26 including the entire rear side of the cover 28 and on part of the surface of the housing of the cover 28. In the sample status of the notebook type personal computer 25 in FIG. 12 and FIG. 13, it is assumed that the user is about to terminate Windows (Windows: name of a Microsoft Corporation OS), and in this status, "To quit Windows To quit Windows, press the button on the rear" is displayed as main information 65 on the liquid crystal display 64. If the user immediately understands from the main information 65 alone which member should be operated, no further information presentation will be requested, but if the user does not know which member should be operated, he or she will move the cursor within the range of the main information 65, or to "Quit" as a specific position within that range. Then, when the user clicks the left mouse button after making this move, or the cursor display changes to a focus pointer 66 (a specific shape such as an arrow that appears when the cursor reaches a location where additional information is presented) after completion of this move, this is recognized as an event by the CPU of the notebook type personal computer 25, and supplementary information 70 and an arrow 71 are displayed near the termination switch 69 of the rear surface of the cover 28, as shown in FIG. 13. This display is implemented by communication control to electrodes of the electrophoretic display 10. As the supplementary information 70 is displayed close to the termination switch 69, and the point of the arrow 71 indicates the termination switch 69, even an inexperienced personal computer user can immediately and accurately identify the member that should be operated.

Figure 14:
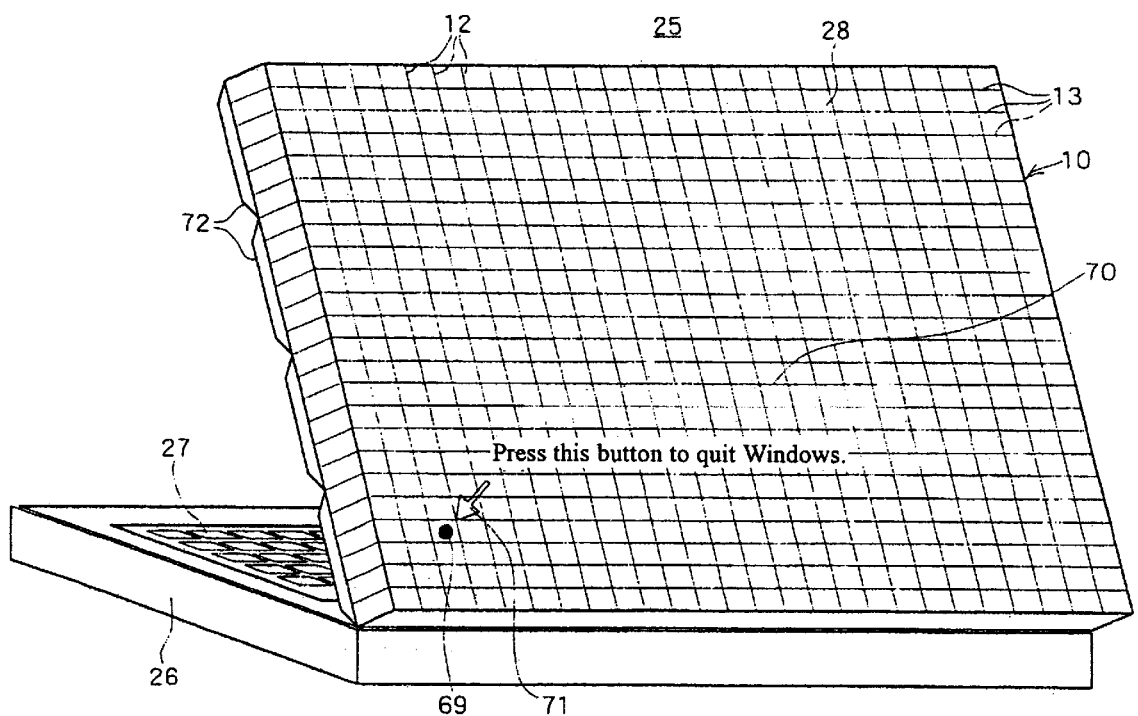
FIG. 14 is a drawing showing the wiring of the upper electrodes and lower electrodes of the electrophoretic display on the cover.

FIG. 14 shows the wiring of the upper electrodes 12 and lower electrodes 13 of the electrophoretic display 10 on the cover 28. The upper electrodes 12 are transparent and the lower electrodes 13 are concealed by the color of the dispersion medium 14 of the cells 11, so that the upper electrodes 12 and lower electrodes 13 are not actually visible to the user. On the rear surface and side surfaces of the cover 28, the lower electrodes 13 extend sideways (i.e. to the right and left), and the upper electrodes 12 extend at right-angles to the lower electrodes 13, so that the upper electrodes 12 and lower electrodes 13 form a lattice. In the drawing, the intervals between the upper electrodes 12 and the intervals between the lower electrodes 13 are shown much greater than in reality to enable the structure to be understood. The electrode drivers 72 are drawn thicker than in reality in the drawing. These are arranged along the horizontal side of the top of the front of the cover 28, and left to right along the vertical side, and control the voltage applied to the upper electrodes 12 and lower electrodes 13. Points of intersection of the upper electrodes 12 and lower electrodes 13 are pixels of the electrophoretic display 10, and the direction of the field applied to the cells 11 can be switched for each pixel. By distributing pixels over the surface in this way, it is possible to display any characters, numerals, symbols, or graphics on the rear surface and side surfaces of the cover 28, and the above described supplementary information 70 and arrow 71 are also displayed by this means.

Figure 15:
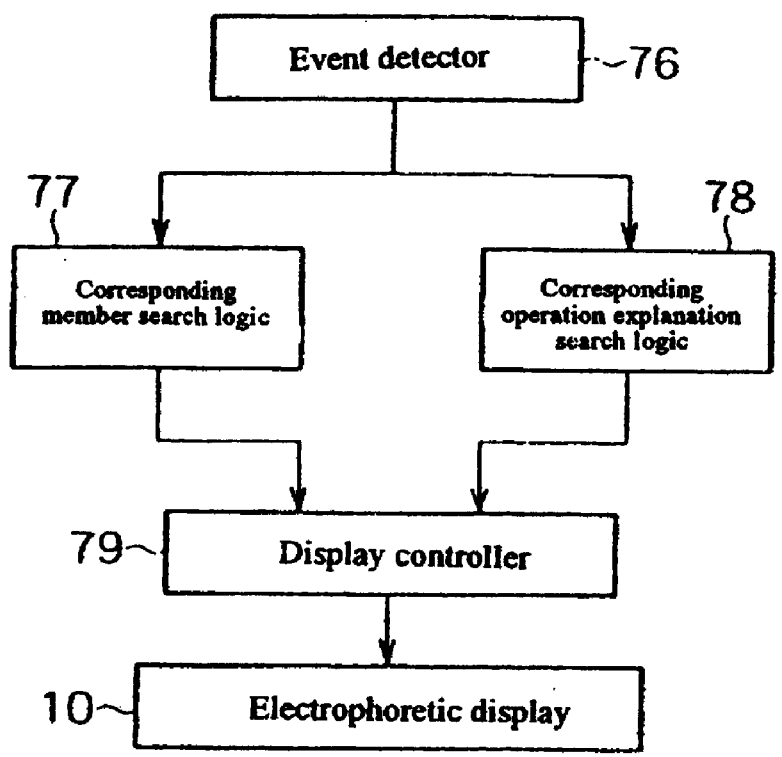
FIG. 15 is a function block diagram of an operation information display control apparatus provided in the cover in the notebook type personal computer in FIG. 12 to FIG. 14.

FIG. 15 is a function block diagram of an operation information display control apparatus 75 provided in the cover 28 in the notebook type personal computer 25 in FIG. 12 to FIG. 14. An event detector 76 detects events. These events may include, for example, the appearance of a focus pointer associated with movement of the cursor to a predetermined position on the liquid crystal display 64. Corresponding member search logic 77 searches for which member the user should operate at the present time in response to an event detected by the event detector 76. There may be not only one but a plurality of these members to be searched for. Corresponding operation explanation search logic 78 searches a predetermined database for suitable explanatory operation information to be displayed to the user in response to an event detected by the event detector 76. Explanatory operation information includes information such as what kind of processing will be performed by operation of a member, or how a member is to be processed. A display controller 79 uses the search results from the corresponding member search logic 77 and corresponding operation explanation search logic 78 as input, and controls the application voltage to the electrophoretic display 10 so that suitable information is displayed to the user in a region of the electrophoretic display 10 close to the present member.

Figure 16:
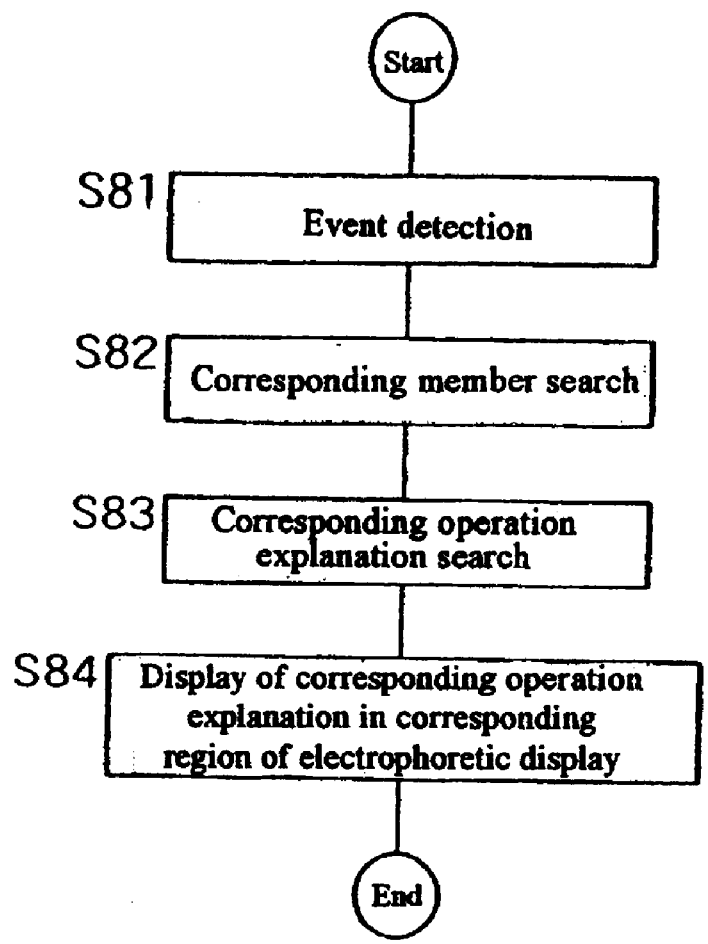
FIG. 16 is a flowchart of the processing for presenting suitable explanatory operation information in a suitable region of an electrophoretic display.

FIG. 16 is a flowchart of the processing for presenting suitable explanatory operation information in a suitable region of the electrophoretic display 10. In S81, an event is detected. In S82, a search is performed for the member corresponding to the currently detected event, that is, to find what and where is the member that the user should now operate. In S83, a predetermined database is searched for an operation explanation corresponding to the event detected in S81. The order of S82 and S83 may be reversed, that is to say, these steps may be executed in the order S83, S82. In S84, explanatory operation information retrieved in S83 is displayed in the corresponding region of the electrophoretic display 10 close to the current member identified on the basis of the search in S82.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

We claim:

1. An electronic apparatus comprising:
   a housing that accommodates an electronic element internally;
   an electrophoretic display arranged on a surface of said housing;
   a display controller for displaying, on said electrophoretic display, an operation guide for a user;
   a main display being capable of displaying information faster than said eletrophoretic display;
   a member that is operated by a user; wherein said electrophoretic display is arranged at a location closer to said member than said main display; and said display controller display an icon which represents the function of said member on said electrophoretic display; wherein said display controller displays on said electrophoretic display, a guide for informing a user of a member operated by said user;
   an event detector for detecting an event that requests predetermined operation of a member by the user; and
   member search logic for searching for a member to be operated by the user in response to said event when said event is detected; wherein said display controller displays in a region of said electrophoretic display in a vicinity of a searched member that said searched member should be operated by the user.

2. The electronic apparatus according to claim 1, further comprising:
   message search logic for searching a predetermined database for a message to be displayed in said region of said electrophoretic display in response to said event when said event is detected; wherein said display controller displays searched message information in said region.

3. An electronic apparatus comprising:
   a housing that accommodates an electronic element internally;

an electrophoretic display arranged on a surface of said housing; and a display controller for displaying on said electrophoretic display an electrical status of at least one of said electronic apparatus and said electronic element wherein said electrical status includes at least the status of a power supply of said electronic apparatus and the status of a CPU as said electronic element.

4. The electronic apparatus according to claim 3, wherein said display controller displays on said electrophoretic display a color corresponding to said electrical status.

5. An electronic apparatus comprising:

at least one member to be operated by a user;

an electrophoretic display arranged on at least one of a top surface and a side surface of said member; and a display controller for displaying on said electrophoretic display an icon representing the function of said member, said electrophoretic display being capable of displaying another icon representing another function of said member in response to an operation mode of said electronic apparatus.

6. The electronic apparatus according to claim 5, wherein said apparatus has a plurality of members, and said members are a plurality of character input keys for inputting character code data corresponding to a particular character input mode; and said display controller displays on said electrophoretic display an input character valid for operation of said individual character input key in the current character input mode.

7. The electronic apparatus according to claim 6, wherein said electrophoretic display is provided with top-surface electrodes having shapes of key-top characters corresponding to each character input mode on each character key;

each top-surface electrode for a same set of characters is connected to a common voltage pulse application line; and said display controller, when the input mode is switched, supplies a display character erasure voltage pulse to a pulse application line corresponding to the character before switching, and also supplies a display character display voltage pulse to a pulse application line corresponding to the character after switching.

8. The electronic apparatus according to claim 5, wherein said members are a plurality of function keys; and said display controller displays on said electrophoretic display an icon in accordance with the current operation mode of said apparatus.

9. The electronic apparatus according to claim 8, comprising:

a selector for selecting a language used for operating said apparatus in accordance with the operation mode of said apparatus; wherein said display controller displays on said electrophoretic display an icon corresponding to said selected language.

* * * * *